A. N. ROTH.
BANANA HARVESTING DEVICE.
APPLICATION FILED MAY 22, 1914.
1,113,694.
Patented Oct. 13, 1914.
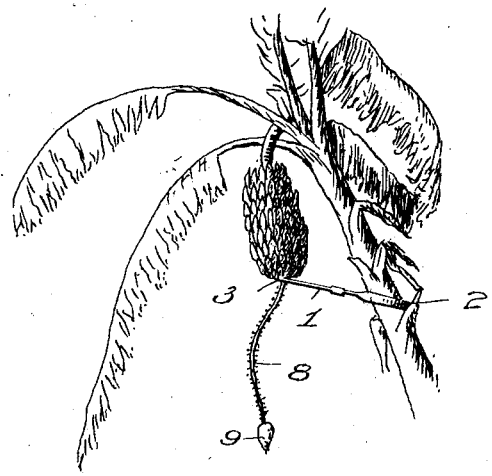
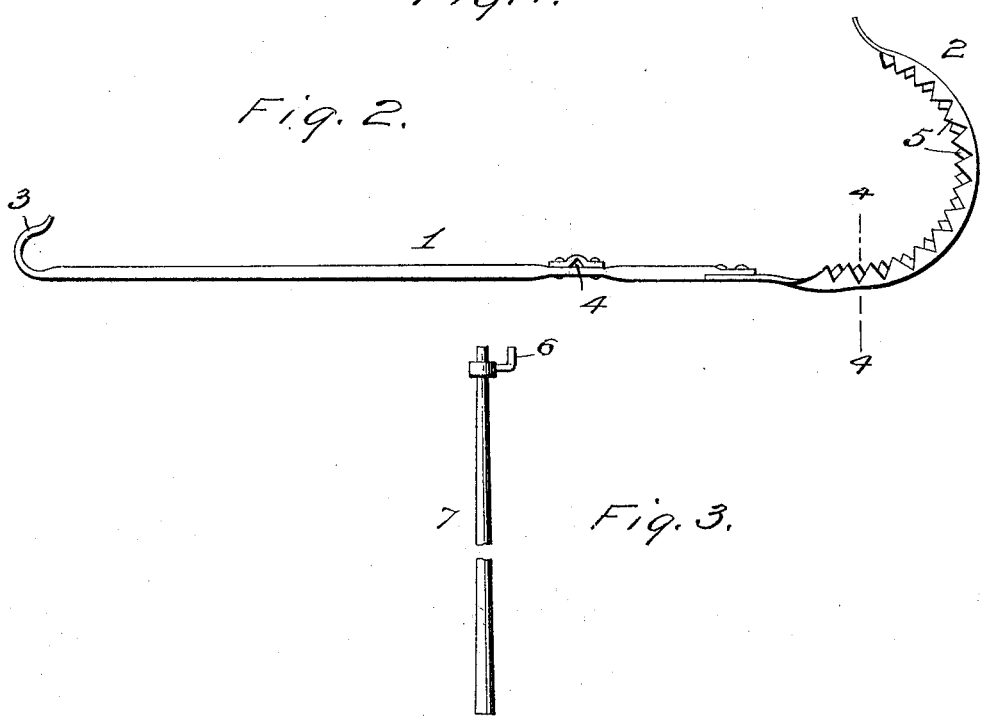

UNITED STATES PATENT OFFICE.

ARNOLD N. ROTH, OF QUIRIGUA, GUATEMALA.

BANANA-HARVESTING DEVICE.

1,113,694.  Specification of Letters Patent.  Patented Oct. 13, 1914.

Application filed May 22, 1914. Serial No. 840,241.

*To all whom it may concern:*

Be it known that I, ARNOLD N. ROTH, a citizen of the United States, residing at Maya Farm, Quirigua, district of Puerto Barrios, Guatemala, Central America, have invented new and useful Improvements in Banana-Harvesting Devices, of which the following is a specification.

In the ordinary gathering of bananas, the trunk of the banana tree is stabbed at a suitable height with a blade at the end of a long pole, whereupon the weight of the bunch of bananas on the tree will cause the same to bend over and place the bunch in convenient position to be cut from the tree. Incidental to the said bending of the tree trunk, the bunch of fruit tends, by reason of its weight, to swing outwardly or away from the tree trunk, and because of this and the sudden fall of the bunch, it frequently happens that the stem joining the bunch to the tree breaks off clearly, or else is split back into the bunch, with the result that the bunch is rendered unfit for market, and is possessed of no market value.

The object of my invention is to obviate the contingency of the stem breaking or splitting in the manner stated by providing a device calculated to hold the lower portion of a bunch of bananas to the trunk of the banana tree during the bending of the tree referred to, thereby precluding breaking or splitting of the stem and preserving the bunch in perfect marketable condition until it is cut by an operative and removed for shipment.

My novel device is designed to be quickly and easily placed on and removed from a banana tree, as will be fully understood from the following description and claims when the same are read in connection with the drawings, accompanying and forming part of this specification, in which:

Figure 1 is a perspective showing the device constituting the preferred embodiment of my invention, as properly arranged relative to a banana tree and a bunch of bananas thereon. Fig. 2 is a plan view of the device. Fig. 3 is an elevation of the implement that is preferably employed in positioning the device on the trunk of a banana palm. Fig. 4 is an enlarged section on line 4—4 of Fig. 2.

Similar numerals of reference designate corresponding parts in all of the views of the drawings.

My novel device is preferably formed of metal, and comprises a main bar 1, a loop 2 at one end of the main bar, and a comparatively small loop 3 at the opposite end of said bar; the mouths of said loops being preferably, though not necessarily, opposed as shown. In the bar 1 is an aperture 4, preferably triangular in form, as shown, and at the inner side or edge of the loop portion 2 are inwardly extending sharp teeth 5. The aperture 4 is provided to receive the angular hook 6 on a pole 7, Fig. 3, through the medium of which my novel device is properly positioned on the trunk of a banana tree and relative to a bunch of bananas on the tree to enable the comparatively small loop 3 of the device to receive the appendage 8 that normally depends from the lower end of a bunch of bananas and terminates in an enlargement 9, as shown in Fig. 1. The hook 6 of angular form in cross-section fitting snugly in the correspondingly shaped aperture 4, is designed to prevent my novel device from swinging on the placing implement during the positioning of the device. It is obvious, however, that any other means may be employed for the purpose without affecting my invention; also, that without departure from my claimed invention, my novel device may be placed in position in any approved manner.

In the practical use of my novel device, the same is placed, with the aid of the pole 7, so that the loop 3 straddles the appendage 8 of the bunch of bananas, and the device is then moved so that the loop 2 straddles the tree trunk. The device will be maintained in said position by reason of the teeth 5 engaging the trunk. Then when the tree is stabbed and the upper portion of the tree bends over, my novel device will hold the lower portion of the bunch to the tree trunk for the purpose described.

My novel device is held by the teeth 5 in the position shown in Fig. 1 when the bunch comes down with the bent part of the tree, and hence said device is well adapted to serve the purpose ascribed to it.

By comparison of Figs. 3 and 4, it will be noticed that the teeth of the upper and lower series of the loop 2, are arranged in staggered relation. This is advantageous, since it precludes the teeth forming grooves in and tearing their way downwardly through the trunk of the banana tree. The upper and lower series of teeth are also advantageous because after the bending of the tree, due to the same being stabbed below the loop 2, the device sometimes assumes such a position relative to the trunk that only one series of the teeth dig into and hold on the trunk.

Having described my invention, what I claim and desire to secure by Letters-Patent, is:

1. A banana harvesting device, comprising a main bar, a loop at one end of the bar and toothed at its inner edge, and a comparatively small loop at the opposite end of the bar.

2. A banana harvesting device, comprising a main bar having an aperture, of angular form in cross-section, to receive a correspondingly shaped part of a placing implement, a loop at one end of said bar and toothed at its inner edge, and a comparatively small loop at the opposite end of the bar.

3. A banana harvesting device, comprising a main bar equipped for the engagement of a placing implement, means at one end of the bar for maintaining it in laterally extended position on a tree trunk, and means on the bar for engaging a banana bunch.

4. A banana harvesting device having loops to engage the trunk of a banana tree and a bunch of bananas on the tree, respectively; the trunk-engaging loop being toothed.

5. A banana harvesting device having loops to engage the trunk of a banana tree and a bunch of bananas on the tree, respectively; the trunk-engaging loop being provided with upper and lower sets of teeth, and the teeth of one set being arranged opposite the interdental spaces of the other set.

In testimony whereof I have hereunto set my hand in presence of two subscribing witnesses.

ARNOLD N. ROTH.

Witnesses:
 EDNA J. SHEEHY,
 NELLIE C. HEALY.

---

Copies of this patent may be obtained for five cents each, by addressing the "Commissioner of Patents, Washington, D. C."